R. BROWN.
COW MILKER.
APPLICATION FILED APR. 6, 1910.
966,307. Patented Aug. 2, 1910.
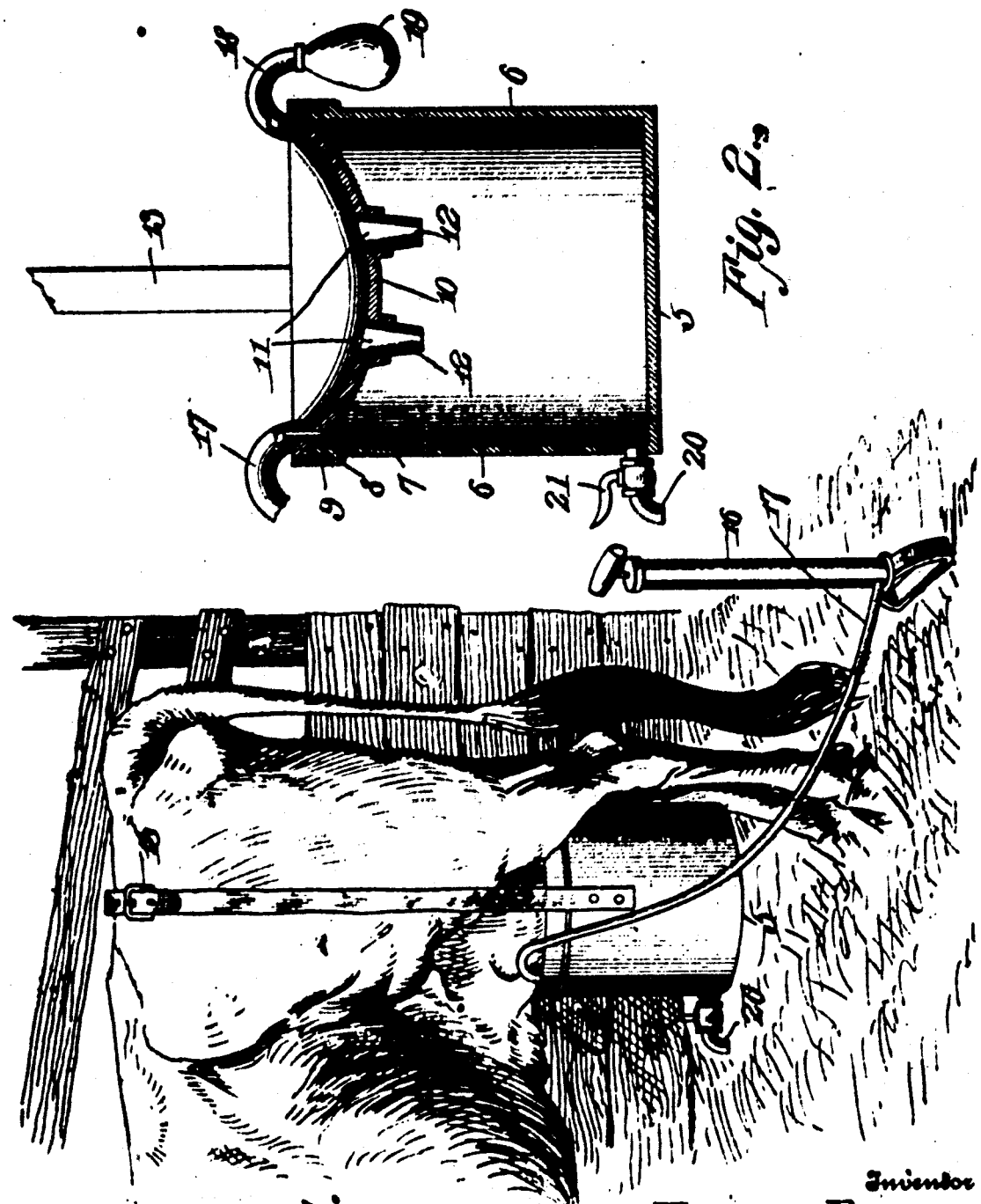
Inventor
Rosa Brown,
By Victor J. Evans
Attorney
Witnesses

UNITED STATES PATENT OFFICE.

ROSA BROWN, OF ELK CITY, OKLAHO.

COW-MILKER.

966,307.   Specification of Letters Patent.   Patented Aug. 2, 1910.

Application filed April 6, 1910.   Serial No. 553,726.

*To all whom it may concern:*

Be it known that I, ROSA BROWN, a citizen of the United States, residing at Elk City, in the county of Beckham and State of Oklahoma, have invented new and useful Improvements in Cow-Milkers, of which the following is a specification.

This invention relates to improvements in cow milkers and has for its object the provision of a device of that kind comprising a tank or receptacle adapted for attachment to the animal and when so attached to have a partial vacuum created therein thus causing the milk to flow from the animal into the receptacle.

Another object is the provision of a receptacle having a concave head adapted to conform to the configuration of the udder of the animal, the said head having a plurality of teat tubes positioned to coöperate with the head to form a tight joint when positioned on the animal.

With these and other objects in view, which will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size, and minor details of the device may be made within the scope of the appended claim, without departing from the spirit or sacrificing any of the advantages of the invention.

In the accompanying drawings forming a part of the specification:—Figure 1 is a perspective view of the receptacle and pump showing the receptacle applied to an animal. Fig. 2 is a vertical sectional view of the receptacle.

Similar numerals of reference are employed to designate corresponding parts throughout.

The receptacle is a hollow cylindrical shaped structure comprising a bottom 5 from the periphery of which rises the side wall 6. The head or cover designated in general by the numeral 7 may be fixedly secured to the upper edge of the side wall, or as shown in the drawings, the side wall 6 may be provided adjacent to its upper edge with a circumferential bend 8 and the head provided with a depending flange 9 to embrace the upper end of the wall 6 and bear on the said bend.

As shown in the drawings the body portion of the head is bulged inwardly or concaved as shown at 10 and is provided at its central portion with a plurality of openings 11. Arranged on the convex surface of the head and depending therefrom and surrounding the openings 11 are a plurality of teat tubes 12. These members are preferably of rubber, or its equivalent and are of a diameter to receive the teats of the animal. The tubes 12 extend downwardly for a short distance and may be slightly tapered in order to bind on teats of various diameters. The concavity 10 corresponds to the convexity of the base of the udder of the animal and it will be evident when the teats of the animal are completely inserted in the tubes and the concave surface bearing on the udder of the cow that a tight joint will be provided to prevent the entrance of air.

The receptacle is held positioned on the animal by means of a pair of straps 13 the lower terminals of which are fixedly secured at diametrically opposite points on the outer surface of the receptacle, the straps being of sufficient length to permit their upper end portions to be secured together over the back of the animal, it being understood that the straps 13 will be provided with a buckle 15 to receive the end portion of the strap 14.

A vacuum pump is designated by the numeral 16. In the present instance I have shown a well known form of hand pump. It must be understood, however, that I am not to be limited to the employment of this type of pump since it will be readily understood from what will appear later how any other form of vacuum pump might be equally as well employed, without departing from the spirit of the invention.

A vacuum tube is designated by the numeral 17 and has one terminal connected with the pump, while its opposite terminal is tapped into or otherwise secured in an opening in the head 7 and adjacent to the head thereof.

With this construction it will be manifest when the parts are in position as shown in Fig. 1 that by operating the pump to create a vacuum in the receptacle that the milk will flow from the cow and into the receptacle.

In order to indicate to the operator when a sufficient vacuum is formed in the receptacle I provide a tube 18, one end of which is tapped into the head 7 and the opposite end of which is provided with a rubber bulb 19, the said bulb collapsing when the greater portion of the air has been exhausted from the receptacle. As shown in the drawings an outlet tube is provided for the receptacle and is designated by the numeral 20. This member has one end tapped into the side wall 6 and is provided with a valve 21 which when opened permits the liquid to flow through the tube 20 and into a receptacle.

From the foregoing it will be seen that I have provided a device which is comparatively simple in structure and inexpensive in manufacture, embodying few parts and these so arranged that the danger of derangement will be reduced to a minimum.

Having thus described the invention, what is claimed as new is:—

In a milking apparatus, the combination with a vacuum pump; of a receptacle provided with a concaved head, said head being provided with a plurality of spaced tapered openings, and a plurality of depending tapered flanges surrounding said openings, a plurality of tapered teat tubes extending through said openings and flanges and projecting into the receptacle, means to embrace the body of the cow and connected with the receptacle and serving to support the latter in such position that the concaved head will bear on the udder of the cow, a tubular connection between the upper end of the receptacle and vacuum pump, and a drain cock located at the lower end of the receptacle.

In testimony whereof I affix my signature in presence of two witnesses.

ROSA BROWN.

Witnesses:
S. A. STEWART,
CHARLES J. CLARK.